A. GREBE.
ILLUMINATING MEANS FOR TELESCOPE CROSS HAIRS.
APPLICATION FILED MAY 1, 1914.
1,167,991.    Patented Jan. 11, 1916.
3 SHEETS—SHEET 2.
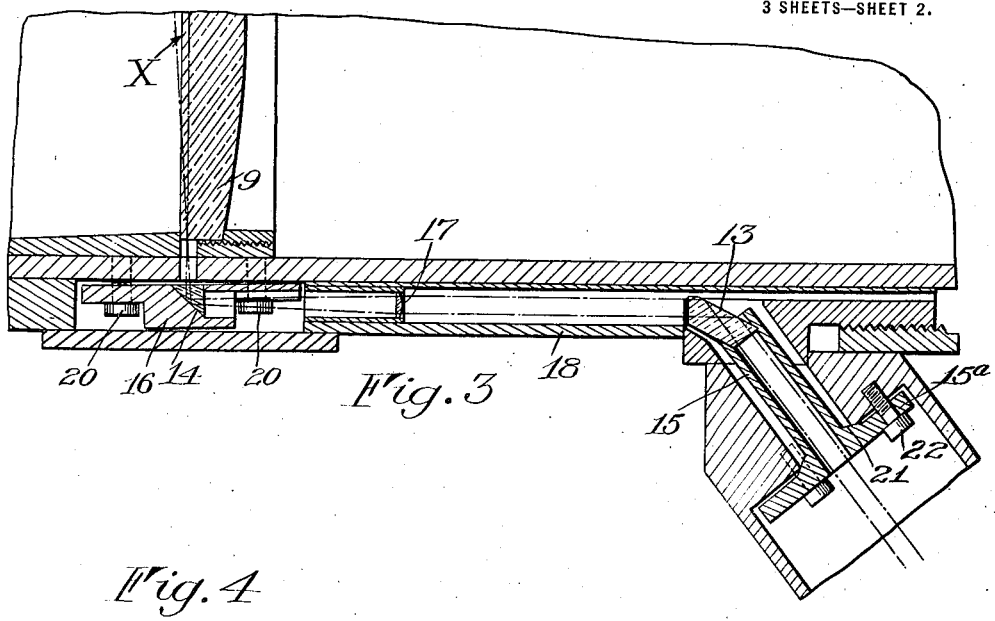
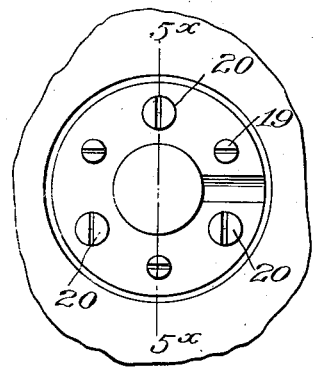
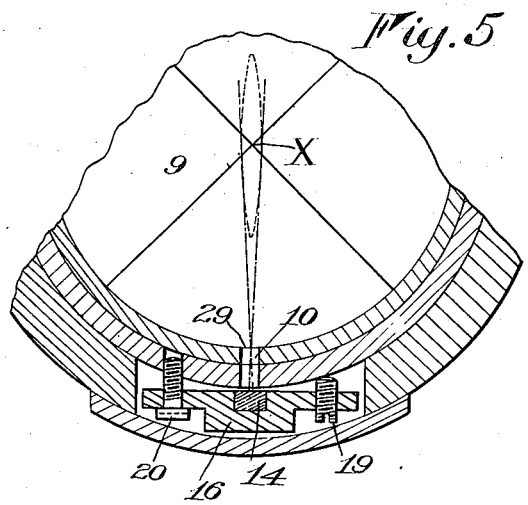

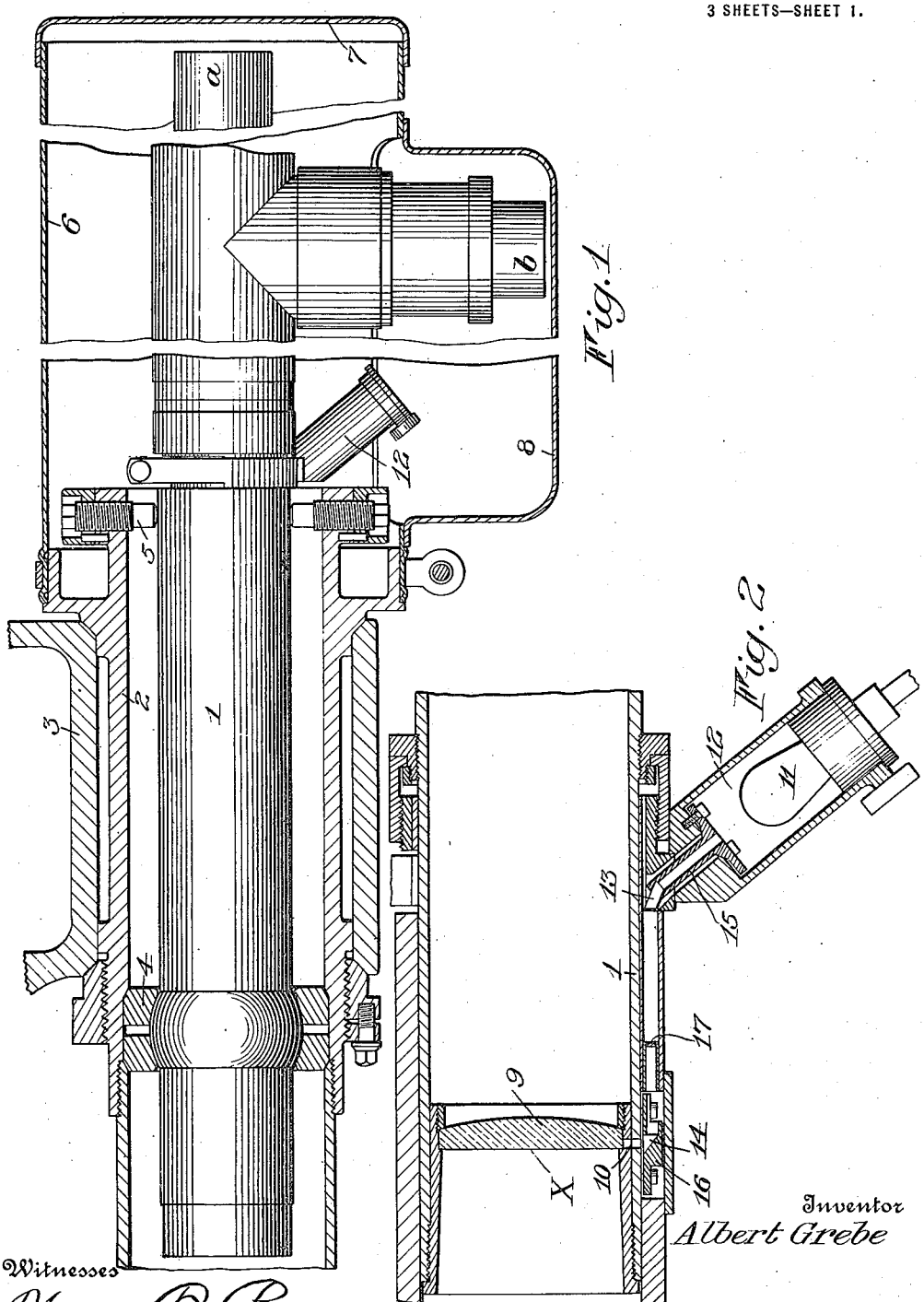

A. GREBE.
ILLUMINATING MEANS FOR TELESCOPE CROSS HAIRS.
APPLICATION FILED MAY 1, 1914.

1,167,991.

Patented Jan. 11, 1916.
3 SHEETS—SHEET 3.

Inventor
Albert Grebe

Witnesses
Walter B. Payne
Nelson H. Kopf

By
his Attorneys

UNITED STATES PATENT OFFICE.

ALBERT GREBE, OF ROCHESTER, NEW YORK, ASSIGNOR TO BAUSCH & LOMB OPTICAL COMPANY, OF ROCHESTER, NEW YORK, A CORPORATION OF NEW YORK.

ILLUMINATING MEANS FOR TELESCOPE CROSS-HAIRS.

1,167,991.  Specification of Letters Patent.  Patented Jan. 11, 1916.

Application filed May 1, 1914. Serial No. 835,671.

*To all whom it may concern:*

Be it known that I, ALBERT GREBE, of Rochester, in the county of Monroe and State of New York, have invented certain new and useful Improvements in Illuminating Means for Telescope Cross-Hairs; and I do hereby declare the following to be a full, clear, and exact description of the same, reference being had to the accompanying drawings, forming a part of this specification, and to the reference-numerals marked thereon.

My present invention relates to telescopes, more particularly to that class used for the purpose of sighting guns of the heavy type such as ship's cannons or ordnance, and it has for its especial object to provide an improved means whereby only a limited area at the point of intersection of the usual cross hairs is illuminated, this result being especially desirable in making observations at night.

A further object attained is the avoidance of any light spots on the field of the cross hairs due to internal reflection of the luminous beam within the lens or other supporting member.

A secondary object is to provide means for transmitting the light from an illuminating lamp to the cross hairs in such instances where, by reason of the construction of the telescopic mounting, it is impossible to locate the lamp at a point directly opposite the cross hairs, such for example as when the sleeve or support for the telescope surrounds it at the place named.

To these and other ends the invention consists in certain improvements and combinations of parts, all as will be hereinafter more fully described, the novel features being pointed out in the claims at the end of the specification.

Figure 6:
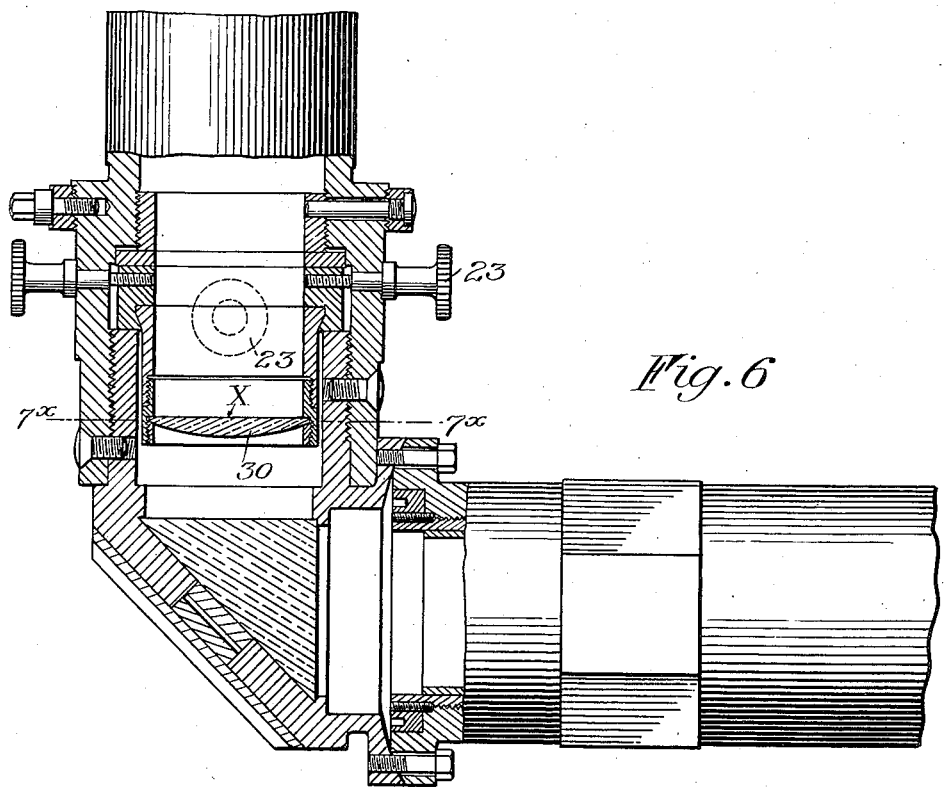
Figure 7:
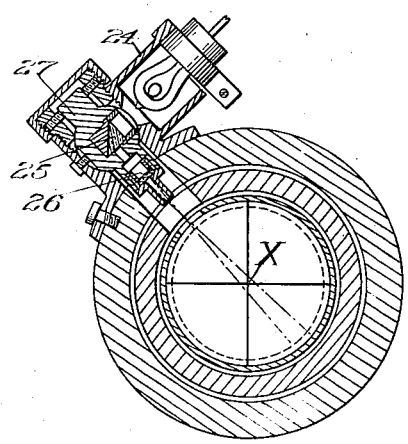

In the drawings: Figure 1 is a longitudinal sectional view through a telescope housing, a support illustrating a telescope mounted therein; Figs. 2 and 3 are sectional views of a portion of the telescope illustrated on a larger scale and showing my invention applied thereto; Fig. 4 is an elevation of one of the prism holders; Fig. 5 is a cross section on the line $5^x$—$5^x$ of Fig. 4; Fig. 6 is an elevation partly in section illustrating another type of telescope showing a modification of my invention applied thereto, and Fig. 7 is a cross sectional view on the line $7^x$—$7^x$ of Fig. 6.

Similar reference numerals throughout the several views indicate the same parts.

In illuminating the usual cross hairs it is desirable to cast a beam of light on a limited area at the intersection thereof, rather than upon the full length of the cross hairs, as when objects are viewed at night the visibility of the image is diminished with illumination of an increased area of the cross hairs. When the cross hairs are illuminated by a beam of light incident from the exterior directly on the surface of the lens or supporting member, a certain portion of light after refraction at said surface is reflected back and forth within the lens between the opposite surfaces thereof, resulting in light spots which affect the visibility of the image. In order to obviate the objection just named and at the same time enable a limited area of the cross hairs to be illuminated, I provide means whereby a beam of light may be projected transversely through the edge of the lens or support, and be incident on a limited area of the surface carrying the cross hairs at an angle greater than the critical angle, so that the light rays upon reflection are directed toward the edge of the lens rather than toward the opposite surface thereof.

In the drawings I have shown my invention as applied to a telescope employed as a gun sight comprising the shell 1 mounted within a sleeve or support 2 carried in the usual fixed bracket 3. The telescope may be adjusted to bring its optical axis into proper position by supporting it near one end in a spherical socket 4, the opposite end being moved in any desired direction by set screws 5 in the sleeve 2. The telescope shown is adapted for observation simultaneously by two observers being provided with the principal eye piece *a*, and the secondary or lateral eye piece *b*. These eye pieces are protected against injury by a housing 6 carried by the inner end of the sleeve 2, access being had to them by caps or closures 7 and 8 respectively.

The cross hairs are usually located on the surface of a lens or other transparent supporting member and are arranged with their point of intersection at the center of said member, which in the present instance is indicated by X on the lens 9. (Figs. 2 and 3.) An aperture 10 is provided in a wall of the telescope at a point opposite the edge of the lens for the admission of a beam of light to the latter from a lamp 11 mounted in a socket 12 carried by the telescope. Inasmuch as the support 3 surrounds the telescope at a point opposite the cross hairs, it is necessary to locate the lamp socket 12 at one side of the sleeve 2, preferably at its inner end within the housing 6 where it is accessible through the opening controlled by the cap 8. The light is transmitted from the lamp to the lens by means of reflectors in the form of prisms 13 and 14 located at opposite ends of a longitudinal passage in the telescope shell, the former carried in the end of a universally adjustable tubular holder 15 at the bottom of the socket 12 and the latter by a similarly adjustable holder 16, received within a recess 10ª in the telescope wall at the outer end of the aperture 10.

The holder 16 is in the form of a circular disk recessed centrally to receive the prism 14, and is capable of being adjusted or tilted by the screws 19 threaded therein bearing against the shell and the headed screws 20 threaded into the telescope shell and serving to lock the disk in its adjusted position.

The tubular holder 15 fits into an aperture of larger diameter which permits its lateral movement in all directions and the tube is provided with a head 15ª and a surface or fillet 21 bearing against the edge of the aperture at the bottom of the lamp socket 12, said parts being so formed that the head 15ª does not seat against the bottom of said socket. Passing through the head 15ª are screws 22 by means of which the head may be tilted and the tube 15 moved into any desired position.

The edge of the lens 9 is ground to size for fitting within its mounting and its edge is normally rough and opaque and therefore a small surface 29 is made smooth and polished at the point where the light is admitted to its interior. In order to accommodate the light beam within the confines of the polished surface which is positioned in alinement with the aperture 10, the pencil of light rays is preferably brought to a focus at the edge of the lens 9, a small lens 17 being used for this purpose and introduced within the longitudinal passage 18 in the wall of the telescope. The incident beam of light being substantially circular in cross section, the illuminated area is in the shape of an ellipse and hence if the beam were directed so that the major axis of the ellipse coincided with one of the cross hairs, a longer portion thereof would be illuminated than on the other cross hair. Therefore it is necessary to direct the beam so that the margin of the illuminated area intercepts the cross hairs at substantially equal distances from their point of intersection. To this end, the cross hairs are so located that a plane passing through the axis of the light beam, and normal or pendicular to the surface of the lens would intersect the latter on a line at approximately an angle of 45 degrees to the cross hairs, as shown in Figs. 5 and 7, by which arrangement substantially equal distances on the cross hairs from their point of intersection are intercepted by the margin of the illuminated area A.

As before noted, that portion of light incident on the surface of the lens, which is not reflected into the eye piece by the cross hairs is totally reflected and strikes the edge of the lens opposite the polished surface 29, and owing to the fact that the edge of the lens is ground, is diffused and therefore cannot result in any bright spots on the field of the image.

In Figs. 6 and 7 I have shown my invention applied to a different form of telescope, in which the lens 30 carrying the cross hairs is adjustable in the line of collimation by means of the screws 23. In this form of instrument, the lamp socket 24 is mounted on the telescope directly opposite the lens, the light from the lamp being transmitted by a reflecting prism 25 and a focusing lens 26 which are both mounted in a universally adjustable holder 27 in the bracket carrying the lamp socket.

An illuminating device constructed in accordance with my invention enables the light to be transmitted to the cross hairs without sensible loss owing to the fact that it is incident on the edge of the lens at the point of entrance at practically right angles, consequently the amount reflected is slight and it is possible to obtain illumination of the cross hairs at their point of intersection without illuminating an appreciable portion of the lens or to interfere with the optical proportions of the telescope. By changing the position of the lens 17 in the longitudinal passage, or by substituting one of different focal length, the incident beam may be brought to a focus before or after entering the lens thereby regulating the width of the beam at the point where it impinges upon the cross hairs, and therefore the length thereof illuminated. However, it will be understood that it is not necessary to use a focusing lens as it will be obvious that a mere parallel beam of the proper size may be used.

I claim as my invention:

1. In a telescope, the combination with a tube, of a glass therein having cross hairs on one surface thereof, said tube having an opening in its side wall in alinement with the edge of the glass, a roughened surface on the edge of the glass at a point opposite the opening and means for directing a beam of light through the opening and through the edge of the glass upon the cross hairs at such an angle that the reflected light impinges upon the roughened surface.

2. In a telescope, the combination with a tube, of a glass therein having cross hairs on one surface and having a roughened edge and a smooth spot at one point of the edge, of means for directing a beam of light through the smooth spot on the edge of the lens upon a limited portion of the cross hairs at such an angle that the reflected light is incident on the roughened edge at a point opposite the smooth spot.

3. In a telescope, the combination with a casing having an aperture, of a glass mounted therein in alinement with the aperture and provided with cross hairs, and having a portion of its periphery polished, a source of illumination and a lens arranged to direct the rays of light received therefrom into said aperture and focus them upon said polished portion.

4. In a device for illuminating cross hairs of telescopes, the combination with a telescope, a support for the telescope and a lens carrying the cross hairs located within the telescope at a point surrounded by the support, of a lamp socket located on the telescope beyond the support and having a lamp therein, and reflectors carried by the telescope and adjacent the lamp socket and lens, one of said reflectors adapted to receive a beam of light from the lamp and transmit it in a longitudinal direction to the other reflector, which latter reflects it upon the edge of the lens.

ALBERT GREBE.

Witnesses:
WILLIAM G. WOODWORTH,
JOHN REMEIN.